Dec. 19, 1922.
A. CASEBEER.
SAW SETTER.
FILED MAY 11 1921.
1,439,144
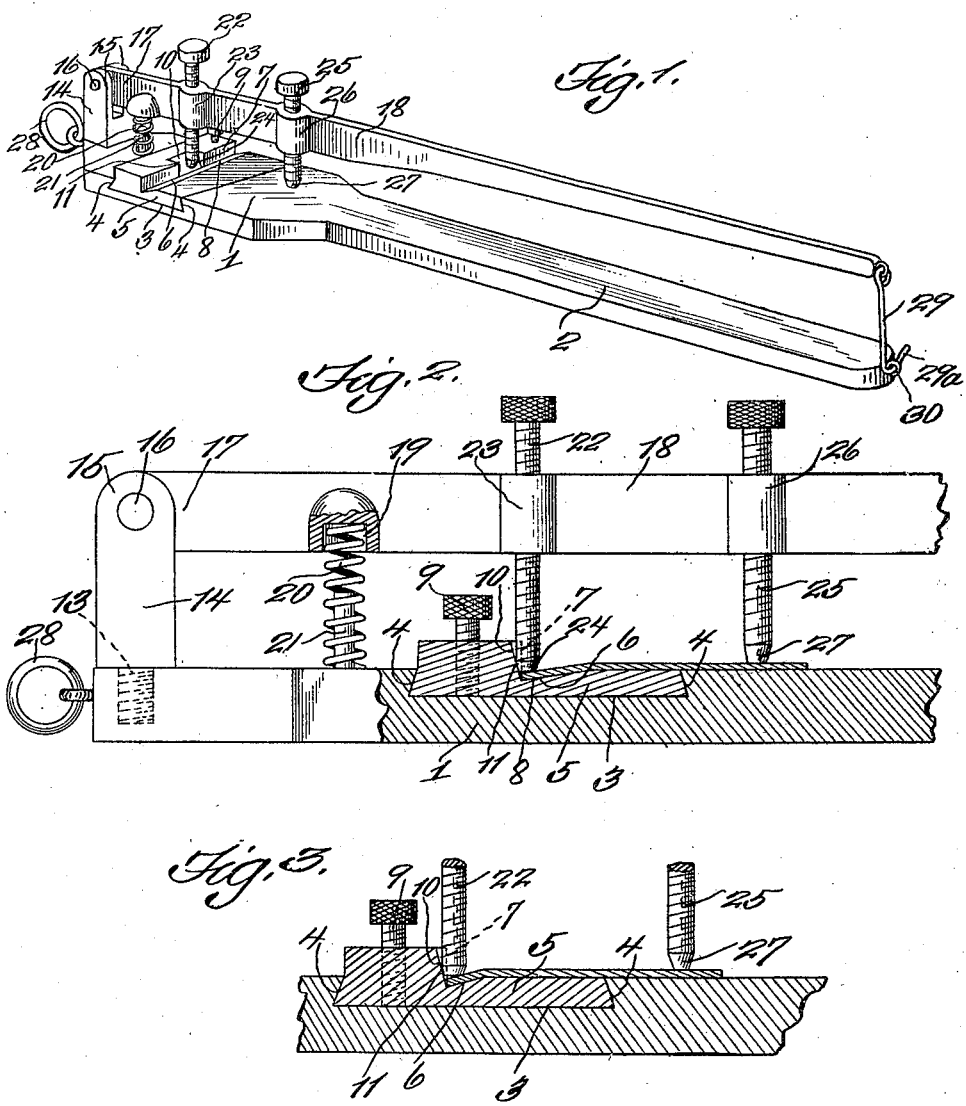
Inventor
Alvin Casebeer,
By Watson E. Coleman
Attorney Patented Dec. 19, 1922.

1,439,144

UNITED STATES PATENT OFFICE.

ALVIN CASEBEER, OF HEPPNER, OREGON.

SAW SETTER.

Application filed May 11, 1921. Serial No. 468,567.

*To all whom it may concern:*

Be it known that I, ALVIN CASEBEER, a citizen of the United States, residing at Heppner, in the county of Morrow and State of Oregon, have invented certain new and useful Improvements in Saw Setters, of which the following is a specification, reference being had to the accompanying drawings.

It is the purpose of the present invention to provide a device of this character principally adapted for setting teeth of cross cut saws, though it may be used for setting teeth for hand and other saws, by employing different saw set blocks.

Another purpose involves a saw setting device including a head block provided with a transversely disposed dovetail groove for the reception of the saw set block, in combination with means for holding the block in position.

Still another purpose is the provision of a saw set block having a transverse depression provided with a beveled wall, conforming to which the teeth of the saw may be set, said depression having a vertical wall, in which a notch is formed provided with an inclined bottom, to which the beveled end of the tooth setting pin or screw conforms, as the tooth is set.

Still another purpose is the provision of a spring tensioned lever carrying the tooth setting pin or screw, to be moved toward the head block or base, for setting each tooth of the saw, as the saw is moved step by step transversely of the head block or base, in combination with an adjustable abutting screw to contact with the saw on the base to limit the lever in its movement.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of the improved saw set constructed in accordance with the invention.

Figure 2 is a longitudinal sectional view on line 2—2 of Figure 1, showing the tooth setting lever and the tooth setting pin or screw in the act of setting a tooth of the saw.

Figure 3 is a detail sectional view somewhat similar to Figure 2, showing another form of saw set block or anvil in place.

Referring to the drawings, 1 designates the head block or base, which is provided with an integral handle 2. The upper face of the head block or base 1 has a transversely disposed depression 3 provided with under cut beveled walls 4. One of these walls extend at a slight diverging angle relatively to the other wall and across the head block or base, so as to permit the set block or anvil 5 to be inserted in the depression or groove from one edge only of the base or head block, thereby holding the anvil or head block removably dovetailed in position. The set block or anvil has a groove 6 comprising a vertical wall 7 and an inclined or beveled wall 8, which converges toward and merges into the vertical wall 7, consequently the depression is of triangular shape in cross section. A suitable set screw 9 engages through the set block or anvil, and into the base or handle as shown, in order to hold the parts in position.

The vertical wall 7 of the transverse groove 6 is provided with a notch 10, the bottom wall 11 of which is inclined or beveled as indicated.

Mounted in any suitable manner as at 13 on the head block is an upright 14 provided with forks 15, there being a fulcrum pin 16 passing through the forks and through one end 17 of the saw tooth setting lever 18.

This saw tooth setting lever has a socket 19 near its pivoted end, for the reception of the upper end of the coiled expansion spring 20, said spring being fitted over a pin 21, to retain the spring in position, when the lever 18 is tilted upwardly, and when the tension on the spring is reduced. A saw setting screw or pin 22 is threaded at a sleeve portion 23 of the lever 18. The lower end of the tooth setting screw is tapered as shown at 24, and this screw is so disposed coincident to the notch 10, that the extremity of the screw will bear against the extremity of the tooth of the saw to be set, so that when the saw is disposed as shown in Figure 2, and the lever depressed, the tapered end 24 of the tooth setting screw 22 will substantially engage and conform to the inclined bottom 10 when the lever 18 is depressed toward the head block or base. When the lever is depressed the tooth setting screw or pin will bear against the tooth of the saw, and bend the tooth of the saw in conformity to the inclined or beveled bottom 8 of the depression or groove 6, thereby pitching the tooth of the saw according to the adjustment of the tooth setting screw or pin. In other words should the tooth setting screw or pin be adjusted relatively to the lever 18, so that when the lever is depressed, the extremity of the screw will move the tooth of the saw in contact with the inclined bottom 8. However should the tooth setting screw or pin be adjusted only a short distance toward the anvil or tooth setting block, the tooth of the saw will be deflected or set to a position slightly out of contact with the bottom wall 8 of the groove or depression 6. It is obvious that other setting blocks or anvils with shallower tapered impressions or grooves therein may be employed, for setting the teeth of different types of saws. The present device is particularly adapted for setting the teeth of a cross cut saw, though it is obvious that hand and other saws may be set, by employing other set blocks or anvils, with different forms of grooves or impressions 6 therein.

The inclined or beveled wall of the notch 10 not only permits the screw 22 to be moved its full distance for setting the tooth of the saw, but also serves the purpose of the transverse corner edge of the extremity of each tooth to conform thereto when set or deflected, without marring the extremity of the tooth.

In order to limit the lever 18 in its movement when setting the tooth of a saw, an abutment screw 25 is threaded through a sleeve portion 26 of the lever 18, so that its extremity 27 may abut the saw on the head block. This abutment screw limits the tooth setting screw in its movement when setting the tooth, so that the extremity of the tooth of the saw will not be injured. In fact the tooth setting screw is limited, so that when the lever 18 is moved toward the base for deflecting or setting the tooth, the screw 22 will move the tooth of the saw just sufficiently to bear slightly upon the inclined bottom or surface 8 of the groove or impression 6.

One end of the set block or base is provided with a ring 28 by which the saw set may be suspended from a nail or any other suitable device carried by a stationary support.

A hook 29 is pivotally and loosely carried by the free extremity of the lever 18, so that the hooked end 29$^a$ may engage an eye 30 on the handle 2 of the base or head block, to hold the parts in position when the saw set is not in use.

The invention having been set forth, what is claimed as being useful is:

1. In a saw set, the combination with a head block, of a saw set block detachably dovetailed in the head block, and provided with a saw tooth receiving groove, the bottom of the groove being beveled or inclined, and a tooth setting lever having a tooth setting screw movable toward the groove or impression, for depressing the saw tooth in engagement with the groove, the vertical wall of the groove having a notch having its bottom inclined to guide the tooth setting screw toward the saw tooth and permitting the end of the screw to overlie the saw tooth, whereby the extremity of the tooth may conform to the inclined bottom of the notch when set.

2. In a saw setter, a base, an anvil detachably carried by the base and provided with a triangular groove, one wall of said groove extending at an angle to the horizontal plane, the other wall having a notch provided with an inclined bottom extending at right angles to the inclined bottom of the groove, whereby the end of a saw setting device may overlie the end of the saw tooth, when setting said tooth, thereby causing the extremity of the tooth to conform to the inclined bottom of said notch, and a movable member provided with a tooth setting device to engage and set the tooth of the saw.

3. In a saw setter, a base, an anvil detachably carried by the base and provided with a triangular groove, one wall of said groove extending at an angle to the horizontal plane, the other wall having a notch provided with an inclined bottom extending at right angles to the inclined bottom of the groove, whereby the end of a saw setting device may overlie the end of the saw tooth, when setting said tooth, thereby causing the extremity of the tooth to conform to the inclined bottom of said notch, and a movable member provided with a tooth setting device to engage and set the tooth of the saw, and means for limiting the movable member so that the tooth setting device will set the tooth to conform to the inclined bottom of the groove of the anvil.

4. In a saw set, a base, a tooth setting anvil removably carried thereon and provided with a groove angular in cross section, one wall of the groove being inclined from a horizontal plane, the other wall being vertical but at an acute angle to the inclined wall, the vertical wall having a notch having an inclined bottom extending at an angle to the inclined wall of the groove, a spring tensioned lever fulcrumed upon the base and overlying the groove of the anvil, a tooth setting screw carried by the lever and having a tapered end conforming to the inclined bottom of the notch, with which the extremity of the saw tooth conforms when the tooth is set by depressing the same into the groove, and means for limiting the lever in its movement when setting the tooth.

In testimony whereof I hereunto affix my signature.

ALVIN CASEBEER.